Patented Jan. 30, 1923.

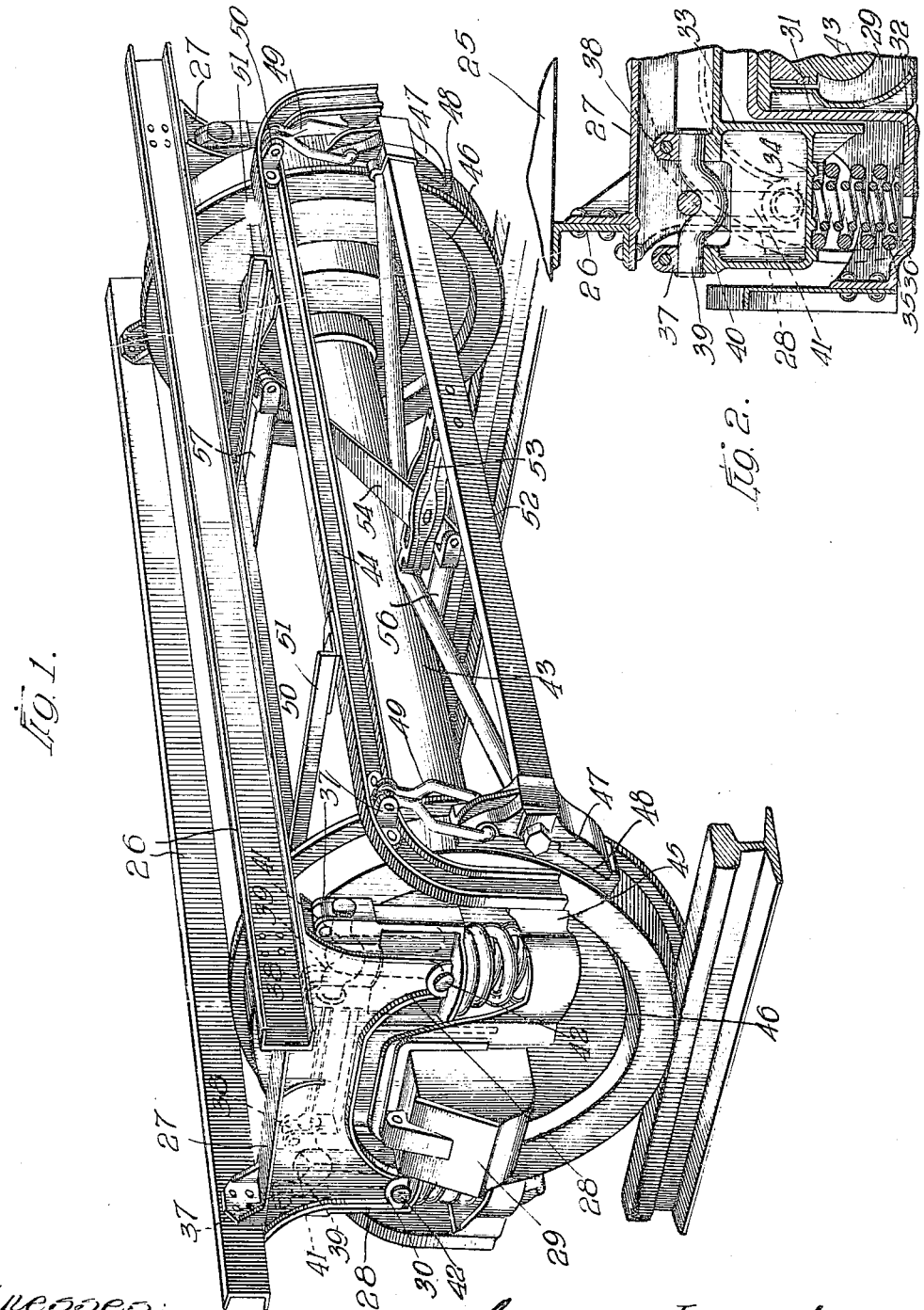

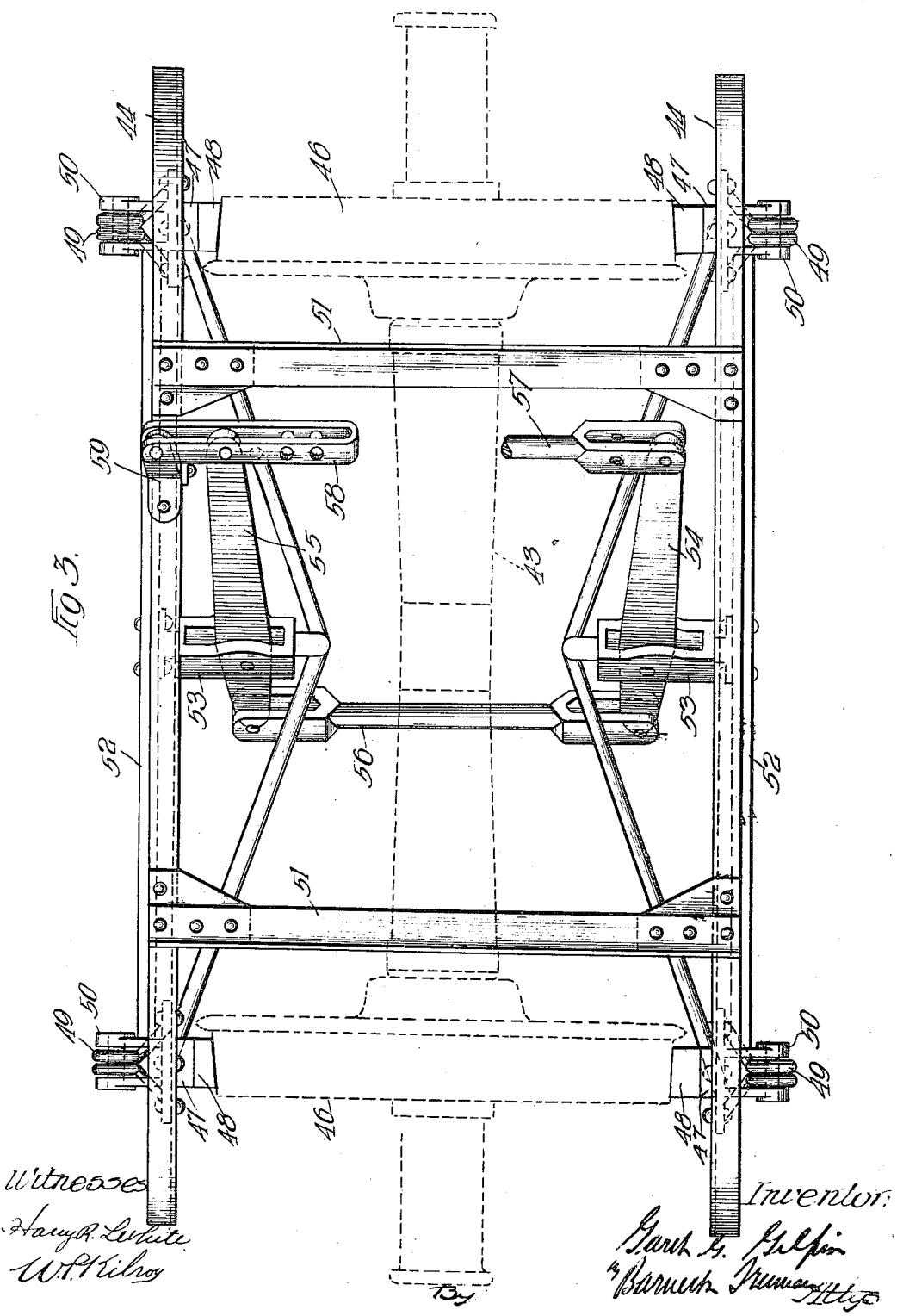

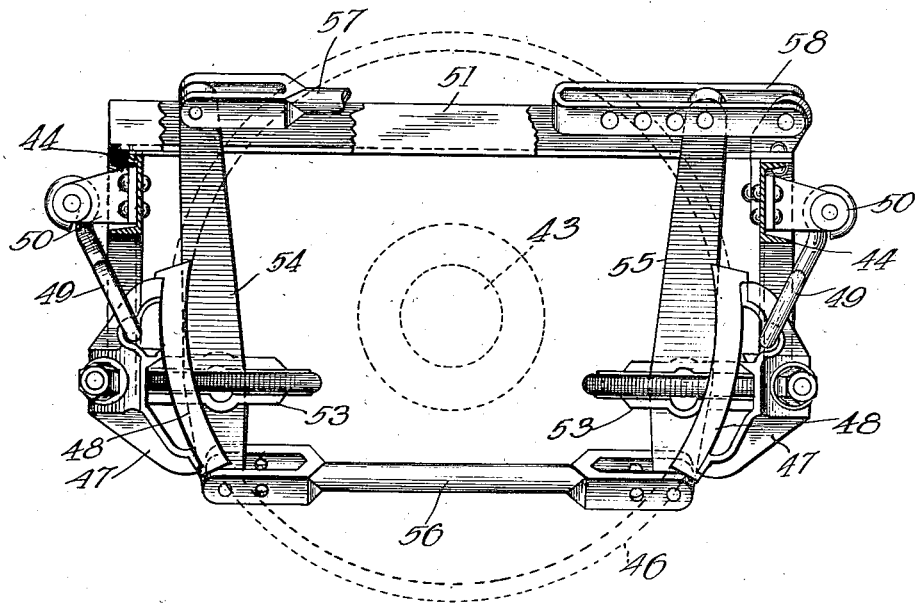
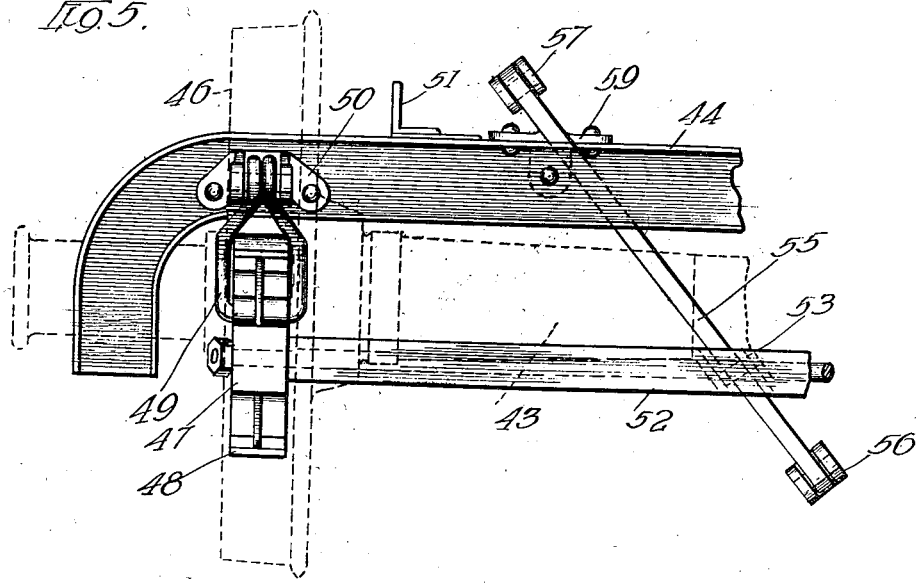

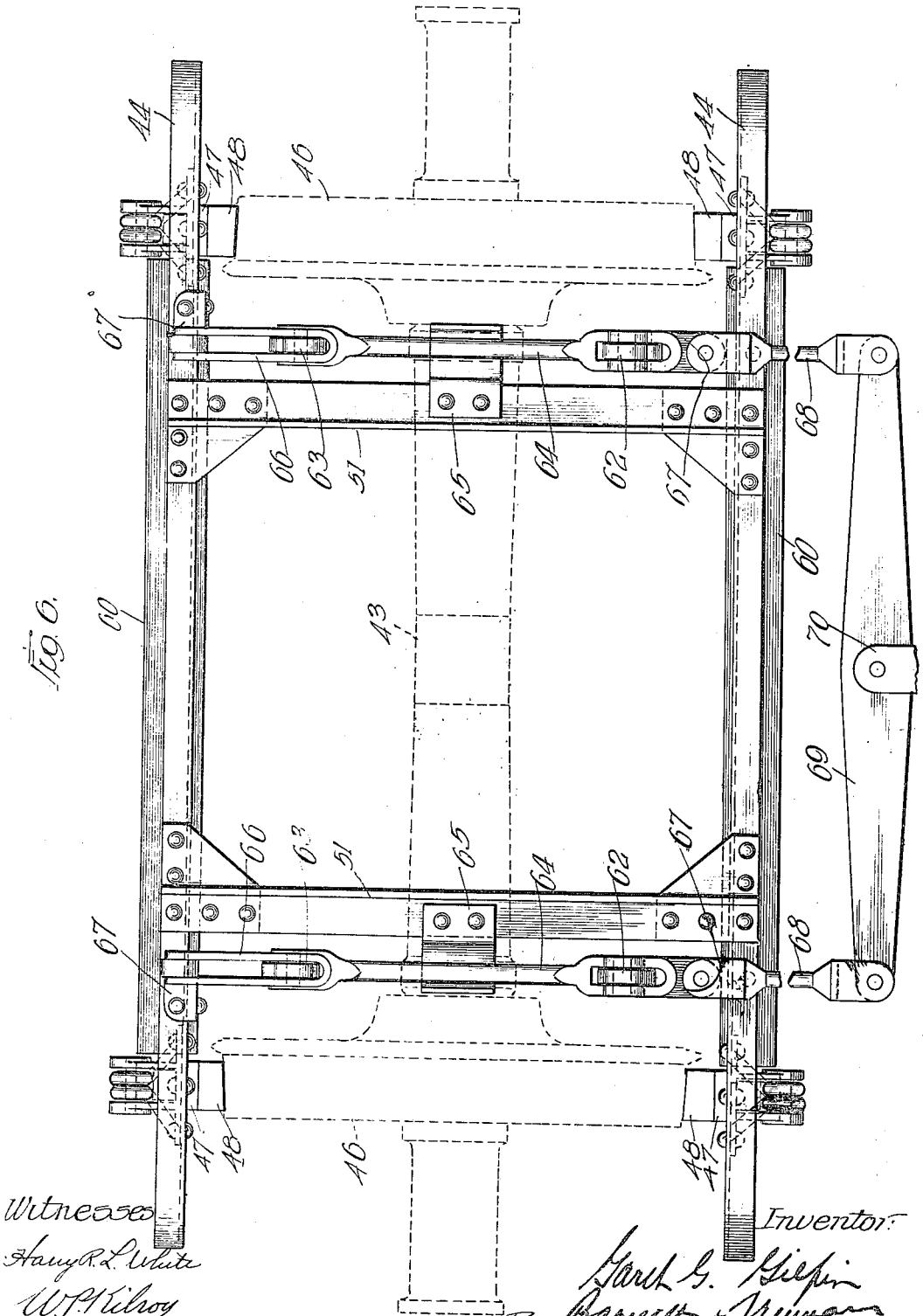

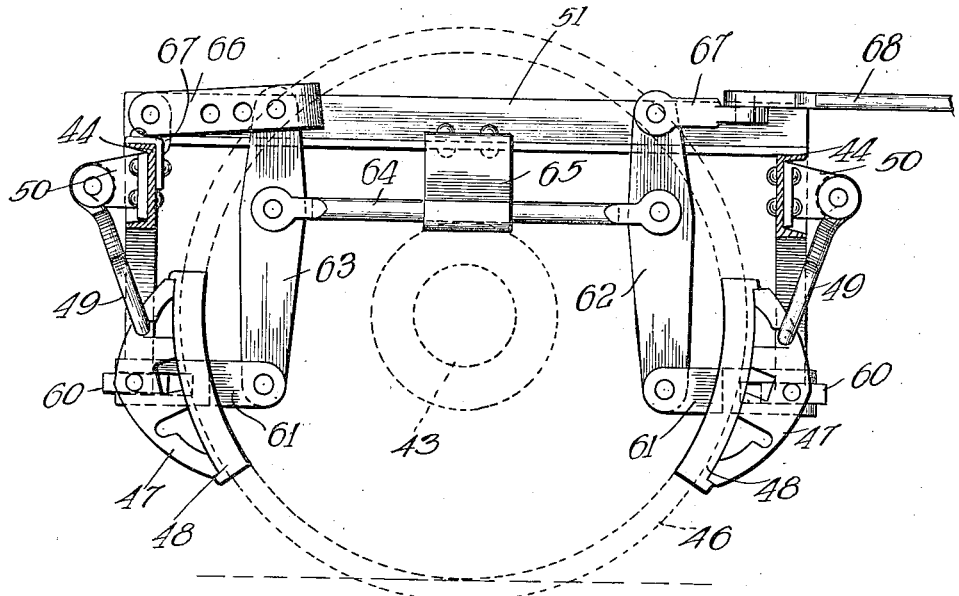
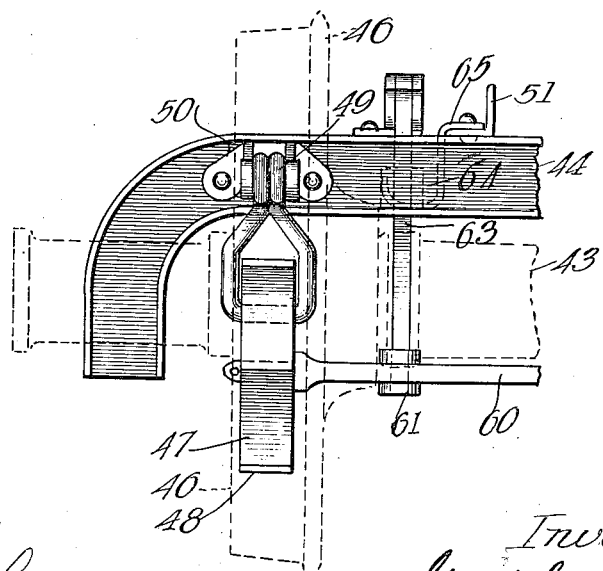

1,443,838

UNITED STATES PATENT OFFICE.

GARTH G. GILPIN, OF RIVERSIDE, ILLINOIS, ASSIGNOR TO WALTER P. MURPHY, OF CHICAGO, ILLINOIS.

RAILWAY-CAR TRUCK.

Application filed April 22, 1919. Serial No. 291,797.

*To all whom it may concern:*

Be it known that I, GARTH G. GILPIN, a citizen of the United States, residing at Riverside, in the county of Cook and State of Illinois, have invented certain new and useful Improvements in Railway-Car Trucks, of which the following is a specification.

My invention relates to improvements in railway car trucks, and the principal object of the invention is to provide a brake rigging suitable for a truck of the type disclosed in my co-pending application Serial No. 264,349 filed November 27, 1918.

The truck referred to departs quite radically from the standard types of railway car trucks in common use in which a car bolster is pivoted at its center to a truck bolster, the ends of which are elastically supported upon the axle journal boxes. In the truck disclosed in my pending application referred to, the opposite sides of the car body are supported directly upon the journal boxes by means of certain elastic and flexible supporting devices permitting the axle to move angularly with respect to the car body when the car rounds a curve. Instead of the usual car and truck bolsters with their center plate connection I employ a single bolster which is rigid with the car body and which transmits the weight of the car directly to the journal boxes. This construction is adapted more especially to a two-wheel truck, although it might be used in connection with a four or six-wheel truck.

The present invention is concerned with the provision of a truck of this general type with a brake rigging, more especially with a brake rigging providing two brake heads for each wheel, the brake heads being arranged on opposite sides of the wheel and adapted for simultaneous operation.

The invention is illustrated, in a preferred embodiment, in the accompanying drawings, wherein Fig. 1 is a view, in perspective, of a two-wheeled truck embodying the improvements constituting the improved combinations and constructions of my invention.

Fig. 2 is a fragmentary vertical sectional view illustrating the supporting device for sustaining one side of the car body on the adjacent axle box.

Fig. 3 is a plan view of the truck.

Fig. 4 is an end elevation of the same, the wheel being shown in dotted lines.

Fig. 5 is a fragmentary view, in elevation, of one end of the truck.

Fig. 6 is a plan view illustrating a modified form of mechanism for setting and releasing the brake heads, and Figs. 7 and 8 are views corresponding to Figs. 4 and 5, respectively, illustrating the modification shown in plan in Fig. 6.

Like characters of reference designate like parts in the several figures of the drawings.

The bolster which supports the longitudinal sills of the car body, one of these sills being shown at 25 (Fig. 2), consists of a pair of transverse members 26, 26 (Fig. 1) connected by longitudinally extending members 27, one at each side of the car, each of these members being formed with a pair of forked, downwardly projecting webs 28 which extend on opposite sides of the journal box 29 and are formed with semi-cylindrical bearings 30 at their lower ends. Associated with each of the journal boxes 29 is a saddle casting 31 which fits over the journal box and is formed on each side of the box with a spring supporting plate 32. These spring supporting plates 32 might, if desired, be cast integral with the journal box. 33 is a sliding member which moves vertically upon the portion of the saddle casting which straddles the journal box. This sliding member is provided on opposite sides of the journal box with horizontal webs 34 by means of which the sliding member is supported on coiled springs 35, 36 carried by the spring supporting plates 32. The sliding member 33 is formed at each side with a pair of projections 37, 38, formed with bearings for a horizontally pivoted hanger 39 having a central depression 40 to provide a seat for a vertical inverted U-shaped hanger 41, the lower extremities 42 of which are bent horizontally and extend under and engage with the semi-cylindrical bearings 30 on the longitudinal bolster member 27. By these arrangements the opposite sides of the body of the car are supported directly upon the journal boxes by elastic supporting means which is sufficiently flexible to allow angular movement as between the car body and the axle, the latter being indicated at 43, when the train rounds a curve.

I will now describe the brake rigging which I have devised for a truck of this type and will refer first to Figs. 1 to 5 inclusive showing one preferred embodiment of my invention. The saddle castings 31 at opposite sides of the car are connected by a pair of arched transverse members 44 which are preferably bent channel beams with their ends riveted to projections 45 formed on said saddle castings. In the preferred form of the invention each of the wheels 46 of the truck is provided with a pair of brake heads 47 having the usual brake shoes 48, the brake heads being arranged on opposite sides of the wheel in each case. The brake heads are suspended by hangers 49 from brackets 50 secured to the transverse members 44. The latter are preferably connected together, for the purpose of rigidifying the truck structure, by the longitudinal bracing members 51. The pair of brake heads suspended from each of the transverse members 44 are connected so as to operate together by a suitable brake beam. I have shown in the drawings a trussed brake beam 52 of common construction. The strut members 53 of the brake beams are slotted and have pivoted thereto levers 54, 55 connected at their lower ends by a link 56. The upper end of lever 54 is connected to the pull rod 57 by means of which the brakes are set and released. The upper end of lever 55 is connected adjustably to a slotted link 58 pivoted to a bracket 59 on one of the transverse members 44. A pull on the rod 57 in the direction indicated by the arrow (Fig. 3) will set all four brakes against the wheels 46. The brakes are released by a reverse movement of the rod.

In Figs. 6, 7 and 8 the construction of the truck is the same as shown in the preceding figures and the brake heads are supported in the same manner from the transverse arched members 44. The brake beams 60 are of different type from those shown in Figs. 1 to 5 inclusive but are of common construction. They are provided with inwardly projecting, rigid arms 61 to which are connected levers 62, 63, there being a pair of these levers at each side of the car which are connected by links 64 passing through guide brackets 65 supported on the longitudinal bracing members 51 of the truck frame. The levers 63 are anchored at their upper ends, adjustably, to slotted links 66 pivoted to brackets 67 on one of the transverse members 44. The levers 62 are connected by links 67, 68 to an equalizing bar 69 to the center point of which is pivoted a pull rod 70 for setting and releasing the brakes.

I claim:

1. A brake rigging for a railway truck comprising in combination with transverse members on opposite sides of the truck axle having a rigid connection with the journal boxes, brake heads suspended from said transverse members, brake beams, connecting together the brake heads on each side of the axle, and a link and lever mechanism engaging said beams and anchored to one of said transverse members for setting and releasing the brake heads.

2. A brake rigging for a railway truck, comprising in combination with a truck frame provided with transverse members on opposite sides of the truck axle having a rigid connection with the journal boxes, brake heads suspended from said transverse members and adapted to engage opposite sides of the truck wheels, brake beams connecting together the brake heads on each side of the axle, and a link and lever mechanism engaging said beams and anchored to the truck frame for setting and releasing the brake heads.

3. A brake rigging for a two wheeled railway truck, comprising in combination with longitudinally extending members supported on the truck journal boxes and transverse members on opposite sides of the axle rigidly connected with said longitudinal members, a pair of brake heads for each wheel to engage said wheels on opposite sides, brake beams connecting together the brake heads on each side of the axle, and link and lever mechanism connected to said brake beams and anchored to one of said transverse members for simultaneously setting and releasing said brake heads.

4. A brake rigging for a two wheeled railway truck, comprising in combination with saddle members supported on the truck journal boxes and transverse members on opposite sides of the axle rigidly connected with said saddle members, a pair of brake heads for each wheel to engage said wheel on opposite sides, brake beams connecting together the brake heads on each side of the axle, and link and lever mechanism connected to said brake beams and anchored to one of said transverse members for simultaneously setting and releasing said brake heads.

5. A brake rigging for a two wheeled railway truck comprising in combination with saddle members supported on the truck journal boxes, transverse members on opposite sides of the axle formed with depending legs rigidly connected with said saddle members and rigidifying braces connecting said transverse members together, a pair of brake heads for each wheel suspended from said transverse members adapted to engage said wheels on opposite sides, brake beams connecting together the brake heads on each side of the axle, and link and lever mechanism connected to said brake beams and anchored to one of the transverse members for simultaneously setting and releasing said brake heads.

GARTH G. GILPIN.